United States Patent
Chae et al.

(10) Patent No.: US 12,322,792 B2
(45) Date of Patent: Jun. 3, 2025

(54) CATHODE FOR LITHIUM SECONDARY BATTERY AND LITHIUM SECONDARY BATTERY INCLUDING CATHODE

(71) Applicant: SK On Co., Ltd., Seoul (KR)

(72) Inventors: Su Ung Chae, Daejeon (KR); Seung Ryul Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/746,065

(22) Filed: Jun. 18, 2024

(65) Prior Publication Data
US 2025/0006903 A1    Jan. 2, 2025

(30) Foreign Application Priority Data
Jun. 27, 2023    (KR) .................. 10-2023-0082900

(51) Int. Cl.
| | |
|---|---|
| *H01M 4/36* | (2006.01) |
| *H01M 4/02* | (2006.01) |
| *H01M 4/131* | (2010.01) |
| *H01M 4/136* | (2010.01) |
| *H01M 4/525* | (2010.01) |
| *H01M 4/58* | (2010.01) |
| *H01M 4/62* | (2006.01) |
| *H01M 10/0525* | (2010.01) |

(52) U.S. Cl.
CPC .......... *H01M 4/366* (2013.01); *H01M 4/131* (2013.01); *H01M 4/136* (2013.01); *H01M 4/525* (2013.01); *H01M 4/5825* (2013.01); *H01M 4/625* (2013.01); *H01M 10/0525* (2013.01); *H01M 2004/021* (2013.01); *H01M 2004/028* (2013.01)

(58) Field of Classification Search
CPC .................................................. H01M 4/366
See application file for complete search history.

(56) References Cited

U.S. PATENT DOCUMENTS

| | | | |
|---|---|---|---|
| 10,243,196 B2 | 3/2019 | Saka et al. | |
| 2015/0017499 A1 | 1/2015 | Nishiyama et al. | |
| 2017/0256776 A1* | 9/2017 | Saka ...................... | H01M 4/505 |
| 2017/0256788 A1* | 9/2017 | Umeyama ............. | H01M 4/366 |

(Continued)

FOREIGN PATENT DOCUMENTS

| | | | |
|---|---|---|---|
| CN | 112825349 A | 5/2021 | |
| CN | 113314694 A | 8/2021 | |

(Continued)

OTHER PUBLICATIONS

Partial European Search Report for European Patent Application No. 24182715.3 issued by the European Patent Office on Nov. 25, 2024.

*Primary Examiner* — Nathanael T Zemui
(74) *Attorney, Agent, or Firm* — IP & T GROUP LLP

(57) ABSTRACT

A cathode is disclosed. In some implementations, the cathode includes a current collector, a first cathode mixture layer on at least one surface of the current collector, and a second cathode mixture layer on the first cathode mixture layer. The first cathode mixture layer includes a first cathode active material having a layered crystal structure, and the second cathode mixture layer includes a second cathode active material having an olivine-based crystal structure. The first cathode mixture layer and the second cathode mixture layer have a thickness ratio of 1:9 to 4:6.

12 Claims, 5 Drawing Sheets

(56) References Cited

U.S. PATENT DOCUMENTS

2017/0338468 A1*  11/2017  Kim .................... H01M 4/0404
2020/0006767 A1*  1/2020   Du ...................... H01M 4/525
2024/0204174 A1*  6/2024   Ko ..................... H01M 10/0525

FOREIGN PATENT DOCUMENTS

CN    113422000 A    9/2021
CN    113823765 A    12/2021

* cited by examiner

CATHODE FOR LITHIUM SECONDARY BATTERY AND LITHIUM SECONDARY BATTERY INCLUDING CATHODE

CROSS-REFERENCE TO RELATED APPLICATION(S)

This patent document claims the priority and benefits of Korean Patent Application No. 10-2023-0082900 filed on Jun. 27, 2023 the disclosure of which is incorporated herein by reference in its entirety.

TECHNICAL FIELD

The disclosure and implementations disclosed in this patent document generally relate to a cathode for a lithium secondary battery and a lithium secondary battery including the same.

BACKGROUND

Due to an increase in the use of portable electronic devices and environmental issues, such as CO2 emissions from the use of fossil fuels, electric vehicles using rechargeable batteries as a power source have been rapidly increased, resulting in a rapid increase in demand for rechargeable batteries. Along with such an increase in demand, demand for high capacity and high safety of rechargeable batteries have been also increasing.

In the global automotive battery market, cathodes for lithium rechargeable batteries may be classified according to a cathode active material used, and may classified into NCM-based cathodes using lithium nickel cobalt manganate as the cathode active material, and LFP-based cathodes using lithium iron phosphate (LFP) and lithium iron manganate (LFMP) as the cathode active material.

Among cathodes, an LFP-based cathode active material used in the LFP-based cathodes may have a stable olivine structure. During desorption of lithium ions, the LFP-based cathode active material may not be changed in structure, and may have excellent high-temperature cycling performance and safety.

Therefore, a lithium iron phosphate cathode active material, a cathode active material having high safety, may contribute to ensuring high safety of lithium rechargeable batteries. However, there is a limitation in that an LFP-based cathode active material has low electronic conductivity and low lithium-ion diffusion coefficient.

Furthermore, a cathode mixture layer, using an LFP-based cathode active material, may have low adhesion to a cathode current collector, which may lead to an increase in resistance. As a result, cell performance may be reduced.

SUMMARY

The present disclosure can be implemented in some embodiments to improve low energy density in a cathode including an LFP-based cathode active material while maintaining high safety of a battery using an LFP-based cathode active material.

In addition, the present disclosure can be implemented in some embodiments to improve electronic conductivity by improving electrolyte wettability in a cathode including an LFP-based cathode active material of a lithium secondary battery, and to improve adhesion with a cathode current collector.

In some embodiments of the present disclosure, a cathode may include a current collector, a first cathode mixture layer on at least one surface of the current collector, and a second cathode mixture layer on the first cathode mixture layer. The first cathode mixture layer may include a first cathode active material having a layered crystal structure, and the second cathode mixture layer may include a second cathode active material having an olivine-based crystal structure. The first cathode mixture layer and the second cathode mixture layer may have a thickness ratio of 1:9 to 4:6.

The first cathode active material may be a lithium transition metal composite oxide represented by Formula 1.

$$Li_aNi_xCo_yMn_zM^1_wO_2 \qquad \text{[Formula 1]}$$ 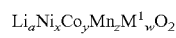

In Formula 1 above, $M^1$ may be at least one selected from the group consisting of Al, Mg, V, Ti, and Zr.

$0.9 \leq a \leq 1.5$, $0.5 \leq x < 1$, $0 < y \leq 0.4$, $0 < z \leq 0.4$, $0 < w \leq 0.04$, and $x+y+z+w=1$ may be satisfied.

The second cathode active material may be a lithium transition metal oxide represented by Formula 2.

$$LiMPO_4 \qquad \text{[Formula 2]}$$ 

In Formula 2, M may be at least one selected from the group consisting of Fe, Mn, Ni, Co, and V.

The second cathode mixture layer may further include a first cathode active material.

The second cathode mixture layer may include 0.5 to 30 wt % of the first cathode active material with respect to a total weight of a cathode active material including the first cathode active material and the second cathode active material in a cathode mixture layer including the first cathode mixture layer and the second cathode mixture layer.

A content of the second cathode active material, included in a cathode mixture layer including the first cathode mixture layer and the second cathode mixture layer, may be 50 wt % or more with respect to a total weight of a cathode active material including the first cathode active material and the second cathode active material.

The second cathode mixture layer may include a linear conductive agent having an aspect ratio of 2 or more.

The linear conductive agent may be included in an amount of 1 to 10 wt % with respect to a total weight of a second cathode mixture layer.

The second cathode mixture layer may include a linear conductive agent of at least one metal fiber selected from the group consisting of a carbon nanotube, a carbon fiber, copper, nickel, aluminum, and silver.

The first cathode mixture layer may further include at least one conductive agent selected from the group consisting of a carbon fiber, a carbon nanotube, graphite, carbon black, acetylene black, Ketjen black, channel black, furnace black, lamp black, thermal black, a metal fiber, a metal powder, a conductive whisker, a conductive metal oxide, and a conductive polymer.

The conductive agent may be included in an amount of 1 to 10 wt % with respect to a total weight of the first cathode mixture layer.

At least one of the first and second cathode mixture layers may further include a third cathode active material other than the first and second cathode active materials.

The third cathode active material may be at least one selected from the group consisting of $Li_2MnO_3$, $Li_2PtO_3$, $LiMn_2O_4$, and $LiNi_{0.5}Mn_{1.5}O_4$.

In some embodiments of the present disclosure, a lithium secondary battery may be provided. An anode and a cathode may be alternately stacked. A separator may be interposed between the anode and the cathode. The cathode may be the above-described cathode.

A cathode according to the present disclosure may include an NCM-based cathode active material having high-capacity properties, thereby improving low electrical conductivity of an LFP-based cathode active material, and improving low adhesion to a cathode current collector and low electrolyte wettability.

Thus, the use of the cathode of the present disclosure may improve resistance of a cell while including the LFP-based cathode active material, and may resolve a hump issue of initial capacity.

BRIEF DESCRIPTION OF DRAWINGS

Certain aspects, features, and advantages of the present disclosure are illustrated by the following detailed description with reference to the accompanying drawings.

DETAILED DESCRIPTION

Features of the present disclosure disclosed in this patent document are described by example embodiments with reference to the accompanying drawings.

The present disclosure can be implemented in some embodiments to provide a cathode for a lithium secondary battery, and a lithium secondary battery including the same.

The present disclosure relates to a cathode for a lithium secondary battery, and a lithium secondary battery including the same. For example, in a cathode including an LFP-based cathode active material as a cathode material, issues of the cathode including an LFP-based cathode material may be improved, while maintaining safety of a battery.

A cathode active material having an olivine structure may have a hexahedral shape, has a lattice structure, has very high stability, and may have high lifespan stability due to a crystal structure less likely to degrade even when lithium ions escape during discharge.

However, the cathode active material having the olivine structure may have low electronic conductivity, a slow diffusion rate of lithium ions, and low energy density. In addition, the cathode active material having the olivine structure may have low adhesion to an electrode current collector.

Furthermore, cathode active material having the olivine structure may have poor wettability to an electrolyte, and thus may have low electrolyte impregnation into the inside of the cathode. For example, an LFP-based cathode including an LFP-based cathode active material may have low electrolyte wettability, resulting in poor electron supply and difficult electrolyte permeation into a cathode mixture layer.

Figure 1:
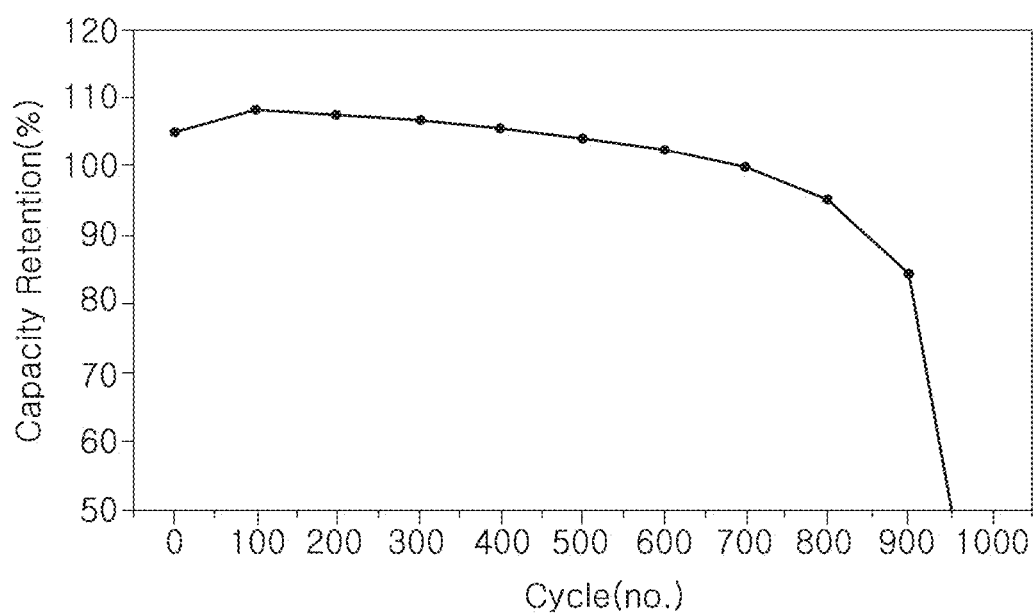
FIG. 1 is a graph illustrating a change in capacity maintenance rate according to a cycle of a cathode using an LFP-based cathode active material.

FIG. 1 is a graph illustrating a change in capacity maintenance rate according to a cycle of a cathode using an LFP-based cathode active material. A cathode, including an LFP-based cathode active material, may exhibit a feature in which 100% capacity is not initially developed and a capacity gradual increase phenomenon (a hump phenomenon) occurs, as illustrated in FIG. 1, due to low electrolyte wettability of the cathode active material. When such a hump phenomenon occurs, an initial cell may not exhibit maximum performance thereof, and a maximum capacity of a battery may not be used until a capacity maintenance rate is stabilized in terms of capacity.

A lithium transition metal compound having the above-described layer structure may include constituent elements of the cathode active material positioned in a layered structure. Thus, when the battery is charged, lithium ions may be stored between layers of a wide and flat crystal lattice, and accordingly the lithium transition metal compound may store a large number of lithium ions and have high energy capacity. In addition, the above-described layered transition metal compound may generally have excellent for electrolyte wettability, such that lithium ions impregnated from a surface of the cathode may easily reach the inside of the cathode.

Accordingly, an embodiment of the present disclosure may provide a cathode in which issues such as low electronic conductivity, slow lithium-ion diffusion rate, and electrolyte wettability of a cathode active material having an olivine structure are improved while ensuring safety of the cathode.

In an embodiment, a cathode including a cathode active material having an olivine structure and a cathode active material having a layered structure may be provided, as described above.

In an example, a cathode according to the present disclosure may be a multilayer cathode including a first cathode mixture layer and a second cathode mixture layer on at least one surface of a cathode current collector. An exemplary cross-section of the cathode according to the present disclosure is illustrated in FIG. 2.

Figure 2:
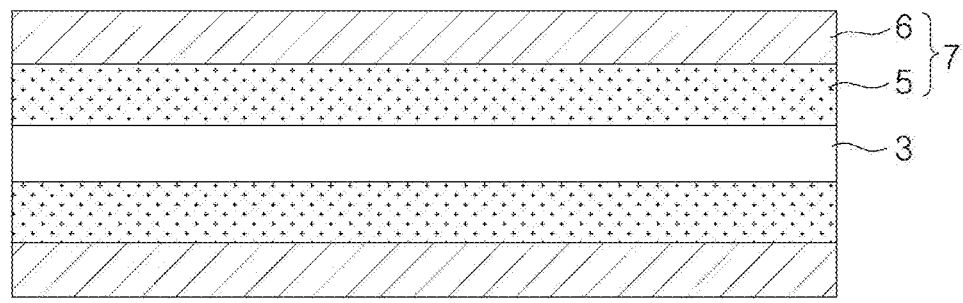
FIG. 2 is a schematic diagram illustrating a cross-section of a cathode according to an embodiment of the present disclosure.

As illustrated in FIG. 2, a cathode 10 according to the present disclosure may include a cathode current collector 3, a first cathode mixture layer 5 including a first cathode active material on one surface or both surfaces of the cathode current collector 3, and a second cathode mixture layer 6 including a second cathode active material on the first cathode mixture layer 5.

In the present disclosure, the second cathode mixture layer 6, formed on the first cathode mixture layer 5, may be formed directly on the first cathode mixture layer 5 to be in contact with the first cathode mixture layer 5. In addition, in the present disclosure, another layer may be interposed between the first cathode mixture layer 5 and the second cathode mixture layer 6.

Specifically, in the cathode 10 provided in the present disclosure, the first cathode mixture layer 5, including a lithium transition metal compound having a layered-structured crystal lattice structure as a first cathode active material, may be formed on the cathode current collector 3, and the second cathode mixture layer 6, including a lithium transition metal compound having an olivine-structured crystal lattice structure as a second cathode active material, may be formed on the first cathode mixture layer 5.

In an embodiment of the present disclosure, the first cathode mixture layer 5, formed on the cathode current collector 3, may include a cathode active material having a layered structure, thereby improving adhesion of a cathode mixture layer 7 to the cathode current collector 3 and reducing resistance in interface between the cathode current collector 3 and the cathode mixture layer 7. The layered-structured cathode active material having improved adhesion and more satisfactory electronic conductivity may be positioned in the vicinity of the cathode current collector 3, thereby improving electronic conductivity.

In addition, an electrolyte, permeating from a surface of a cathode to the inside of the cathode, may more easily penetrate to the vicinity of a cathode current collector due to a layered cathode active material having satisfactory electrolyte wettability, and such improvement in electrolyte wettability may further contribute to improvement in electronic conductivity.

As such, the cathode may include a cathode mixture layer including an olivine-based cathode active material to ensure safety of the cathode, and may include a cathode mixture layer including a layered cathode active material on the inside of the cathode, that is, on the cathode current collector to improve electrical properties.

In the cathode 10, the second cathode mixture layer 6 may be thicker than the first cathode mixture layer 5. Specifically, the first cathode mixture layer 5 and the second cathode mixture layer 6 may have a thickness ratio of 1:9 to 4:6, more specifically, a thickness ratio of 1.5:8.5 to 4:6, 2:8 to 4:6, or 2.5:7.5 to 3.5:6.5.

When the thickness ratio of the first cathode mixture layer 5 and the second cathode mixture layer 6 is outside the above-described range, and a thickness ratio of the first cathode mixture layer 5 is less than 1, the first cathode mixture layer 5 may have an excessively small amount of loading. As a result, the entire cathode 10 may not have sufficiently improved electrolyte wettability, such that the electrolyte may not smoothly permeate into the first cathode mixture layer 5 positioned on the cathode current collector 3. Thus, as illustrated in FIG. 1, the effect of improving the hump phenomenon may not appear.

When the thickness ratio of the first cathode mixture layer 5 and the second cathode mixture layer 6 is outside the above-described range, and the thickness ratio of the first cathode mixture layer 5 is less than 4, the second cathode mixture layer 6 may become thin, such that it may be difficult to ensure battery safety due to the second cathode mixture layer 6. For example, during battery operation, gas generated in a cell may cause a rapid increase in battery temperature and ignition, and a rapid drop in voltage, resulting in degradation in battery performance.

For example, the layered transition metal compound may be represented by general formula LiMO2. Here, M may include at least one of transition metal elements such as Ni, Co, and Mn.

The layered transition metal compound may be, for example, a monolithic lithium transition metal oxide including one of the transition metal elements, a binary lithium transition metal composite oxide including two of the transition metal elements, or a ternary lithium transition metal composite oxide including Ni, Co, and Mn as transition metal elements.

Specifically, the layered transition metal compound may be a compound represented by $Li_aMn_{1-x}M^1_xA_2$, $Li_aMn_{1-x}M^1_xO_{2-y}X_y$, $Li_aMn_2O_{4-z}X_y$, $Li_aMn_{2-x}M^1_xM^2_yA_4$, $Li_aCo_{1-x}M^1_xA_2$, $Li_aCo_{1-x}M^1_xO_{2-y}X_y$, $Li_aNi_{1-x}M^1_xA_2$, $Li_aNi_{1-x}M^1_xO_{2-y}X_y$, $Li_aNi_{1-x}Co_xO_{2-y}X_y$, $Li_aNi_{1-x-y}Co_xM^1_yA_2$, $Li_aNi_{1-x-y}Co_xM^1_yO_{2-z}X_z$, $Li_aNi_{1-x-y}Mn_xM^1_yA_z$, or $Li_aNi_{1-x-y}Mn_xM^1_yO_{2-z}X_z$.

In each of the above formulas, M1 and M2 may be the same or different from each other, may be independently selected from the group consisting of Mg, Al, Co, K, Na, Ca, Si, Ti, Sn, Ge, Ga, B, As, Zr, Mn, Cr, Fe, Sr, V, and a rare earth element. A may be selected from the group consisting of O, F, S and P, and X may be selected from the group consisting of F, S and P. $0.9 \leq a \leq 1.5$, $0 \leq x \leq 0.5$, and $0 \leq y \leq 0.5$, $0 \leq z \leq 2$ may be satisfied.

More specifically, the layered transition metal compound may be a ternary transition metal compound, for example, a compound represented by Formula 1 below.

$$Li_aNi_xCo_yMn_zM^1_wO_2 \quad \text{[Formula 1]}$$

In Formula 1, M1 may be at least one selected from the group consisting of Al, Mg, V, Ti and Zr, and $0.9 \leq a \leq 1.5$, $0.5 \leq x < 1$, $0 < y \leq 0.4$, $0 < z \leq 0.4$, $0 < w \leq 0.04$, and $x+y+z+w=1$ may be satisfied.

In Formula 1, a may represent a molar ratio of lithium in a lithium transition metal oxide represented by Formula 1. For example, $1 \leq a \leq 1.5$, $1 \leq a \leq 1.2$, $1 \leq a \leq 1.15$, or $1 \leq a \leq 1.10$ may be satisfied.

x may represent a molar ratio of nickel among metal components, excluding lithium, in the lithium transition metal oxide represented by Formula 1, and $0.5 \leq x < 1.0$, $0.6 \leq x < 1.0$, or $0.8 \leq x < 1.0$ may be satisfied. y may represent a molar ratio of cobalt among the metal components, excluding lithium, in the lithium transition metal oxide represented by Formula 1, and $0 < y \leq 0.4$ or $0 < y \leq 0.2$ may be satisfied. z may represent a molar ratio of manganese among the metal components, excluding lithium, in the lithium transition metal oxide represented by Formula 1, and $0 < z \leq 0.4$ or $0 < z \leq 0.2$ may be satisfied. In addition, w may represent a molar ratio of a doping element M1 among the metal components, excluding lithium, in the lithium transition metal oxide represented by Formula 1, and $0 < w \leq 0.04$ or $0 < w \leq 0.02$ may be satisfied.

In the present disclosure, the second cathode mixture layer 6, including a cathode active material having an olivine crystal lattice structure, may be formed on the first cathode mixture layer 5. As such, the second cathode mixture layer 6, including an olivine-structured active material, may be formed on the first cathode mixture layer 5, thereby ensuring high battery stability, improving low binding force to the cathode current collector 3 including an olivine-structured cathode active material to improve interfacial resistance, and improving electronic conductivity.

The olivine-structured cathode active material may be a lithium transition metal oxide represented by Formula 2 below.

$$LiMPO_4 \quad \text{[Formula 2]}$$

In Formula 2, M may be at least one selected from the group consisting of Fe, Mn, Ni, Co, and V.

For example, the second cathode active material may be $LiFePO_4$, $LiMnFePO_4$, or the like.

The second cathode mixture layer 6 may include a first cathode active material, together with the second cathode active material. When the second cathode mixture layer 6 further includes the first cathode active material together with the second cathode active material, interfacial resistance between the first cathode mixture layer 5 and the second cathode mixture layer 6 may be reduced, thereby improving electronic conductivity. In addition, the electrolyte wettability may be improved with respect to the second cathode mixture layer 6, and capacity may also be improved.

In a case in which the first cathode active material is mixed with the second cathode active material in the second cathode mixture layer 6, there is no particular limitation, but the first cathode active material may be included in an amount of less than 50 wt %, for example, 0.5 to 30 wt %, with respect to a total weight of a cathode active material including the first cathode active material and the second cathode active material in the cathode mixture layer 7 including the first cathode mixture layer 5 and the second cathode mixture layer 6.

At least one cathode mixture layer, among the first and second cathode mixture layers 5 and 6, may further include an additional cathode active material in addition to the first and second cathode active materials. The additional cathode active material may include, but is not limited to, a cathode active material having a spinel structure. For example, the spinel-structured cathode active material may include lithium manganese oxide ($LiMn_2O_4$), lithium nickel manganese composite oxide ($LiNi_{0.5}Mn_{1.5}O_4$), or the like. More specifically, the spinel-structured cathode active material may further include lithium nickel manganese composite oxide ($LiNi_{0.5}Mn_{1.5}O_4$). The lithium nickel manganese composite oxide described above, having high energy density, may have a high energy density of 650 W·h/kg and a high operating voltage of about 4.7 V compared to lithium, and thus may complement shortcomings of the second cathode active material, and may contribute to further improvement in stability of LFP.

In addition, a lithium transition metal compound (oxide) represented by general formula $Li_2MO_3$ may be included as an additional cathode active material. Here, M may include at least one transition metal element, among transition metal elements including Mn, Fe, Co, and Pt, and may include $Li_2MnO_3$ or $Li_2PtO_3$, for example. In addition, another metal element or non-metal element may be additionally included.

When at least one cathode mixture layer, among the first cathode mixture layer 5 and the second cathode mixture layer 6, further includes the additional cathode active material (a third cathode active material), a content of the third cathode active material may be appropriately selected within a range of maintaining 50 wt % or more of the second cathode active material with respect to the total weight of the cathode active material included in the cathode mixture layer 7. For example, a content of the third cathode active material may be 0.5 to 30 wt %.

Furthermore, at least a portion of the third cathode active material may have a coating layer on a surface thereof. The coating layer may include at least one coating element compound selected from the group consisting of an oxide, a hydroxide, an oxyhydroxide, an oxycarbonate, and a hydroxycarbonate of a coating element. The coating element, included in the coating layer, may include Mg, Al, Co, K, Na, Ca, Si, Ti, V, Sn, Ge, Ga, B, As, Zr, or mixtures thereof. The coating element compound, included in the coating layer, may be amorphous or crystalline.

The first cathode mixture layer 5 and the second cathode mixture layer 6 may include a binder for binding between cathode active materials in each cathode mixture layer and for adhesion between the cathode mixture layer 7 and the cathode current collector 3.

As the binder, any general binder used in a cathode mixture layer may be included without particular limitation, and the binder may include, for example, polyvinyl alcohol, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, an acrylic rubber, or the like.

More specifically, the binder of the second cathode mixture layer 6 may include an acrylic rubber such as polyacrylic acid (PAA), polymethylmethacrylate, polyisobutylmethacrylate, polyethylacrylate, polybutyl acrylate, or poly (2-ethylhexyl acrylate).

The binders, included in the first cathode mixture layer 5 and the second cathode mixture layer 6, may be independently included in an amount of 0.5 to 10 wt % with respect to a weight of each cathode mixture layer. More specifically, a content of the binder may be 0.5 wt % or more, 0.8 wt % or more, 1 wt % or more, 1.2 wt % or more, or 1.5 wt % or more, and may be 10 wt % or less, 7 wt % or less, 5 wt % or less, 4 wt % or less, 3 wt % or less, or 2 wt % or less.

The first cathode mixture layer 5 and the second cathode mixture layer 6 may also independently include a thickener. The thickener may include a cellulose-based compound, and may include, for example, carboxymethylcellulose, hydroxypropylmethylcellulose, methylcellulose, diacetylcellulose, and alkali metal salts thereof. The alkali metal may include Na, K, or Li. The first cathode mixture layer 5 may include one or at least two of the above-described types of binders.

The thickeners, included in the first cathode mixture layer 5 and the second cathode mixture layer 6, may be independently included in an amount of 0.1 to 3 wt % with respect to the weight of each cathode mixture layer. For example, a content of the thickener may be 0.1 wt % or more, 0.3 wt % or more, 0.5 wt % or more, or 0.6 wt % or less, and may be 3 wt % or less, 2.5 wt % or less, 2 wt % or less, 1.5 wt % or less, or 1.2 wt % or less.

The first cathode mixture layer 5 and the second cathode mixture layer 6 may independently include a conductive agent. As the conductive agent, an electronically conductive material, generally used in the cathode 10 of a secondary battery, may be appropriately used without particular limitation, and different conductive agents may be used. In addition, different types of conductive agents may be used depending on a cathode active material used in each cathode mixture layer.

For example, the second cathode mixture layer 6 may include a linear conductive agent as a second conductive agent. The linear conductive agent may have higher electronic conductivity as compared to a point-type conductive agent, and may more easily connect olivine-based cathode active materials included in the second cathode mixture layer 6 to each other, thereby improving electronic conductivity of the olivine-based cathode active materials.

The linear conductive agent may have a long shape, as compared to a thickness thereof. For example, the linear conductive agent may be a conductive agent having an aspect ratio of 2 or more, specifically, 2 or more, 3 or more, 5 or more, 600 or less, 300 or less, 100 or less, 50 or less, or 20 or less. More specifically, the linear conductive agent may include a metal fiber such as a carbon fiber, a carbon nanotube (CNT), copper, nickel, aluminum, or silver. One of a carbon fiber, a carbon nanotube (CNT), copper, nickel, aluminum, and silver may be used, or a mixture of two or more of a carbon fiber, a carbon nanotube (CNT), copper, nickel, aluminum, and silver may be used. More specifically, a carbon fiber and a carbon nanotube may be used.

The linear conductive agent may be included in an amount of 1 to 10 wt % with respect to a weight of the second cathode mixture layer 6. When a content of the linear conductive agent is less than 1 wt %, adhesion between a cathode active material and a current collector may not be easy. When the content of the linear conductive agent is greater than 10 wt %, a capacity of an electrode may be reduced.

A first conductive agent, included in the first cathode mixture layer 5, is not particularly limited, and may include the above-described linear conductive agent or a point-type conductive agent.

For example, the point-type conductive agent may refer to a conductive agent having an aspect ratio of 0.5 to 1.5, and may be substantially spherical. The point-type conductive agents may include graphite such as natural graphite or artificial graphite, a carbon-based material such as carbon black, acetylene black, Ketjen black, channel black, furnace black, lamp black, or thermal black, a metal powder such as copper, nickel, aluminum, or silver, a conductive whisker such as zinc oxide or potassium titanate, a conductive metal oxide such as titanium oxide, and a conductive polymer such as a polyphenylene derivative.

The first conductive agent, included in the first cathode mixture layer 5, is not limited thereto, but may be included in an amount of 1 to 10 wt % with respect to a weight of the first cathode mixture layer 5. When a content of the point-type conductive agent is less than 1 wt %, adhesion between a cathode active material and a current collector may be insufficient. When the content of the point-type conductive agent is greater than 10 wt %, a capacity of an electrode may be reduced.

The cathode 10 according to the present disclosure may be prepared by mixing the above-described cathode active material, binder, and conductive agent with a solvent to prepare a cathode mixture slurry, and coating the cathode mixture slurry on the cathode current collector 3.

The solvent is not particularly limited, and a non-aqueous solvent as well as an aqueous solvent such as water may be used. The non-aqueous solvent may be any solvent generally used to prepare a cathode mixture slurry for a secondary battery, for example, dimethyl sulfoxide (DMSO), isopropyl alcohol, N-Methylpyrrolidone (NMP), acetone, or water, but the present disclosure is not limited thereto.

The cathode current collector 3 may include a metal having satisfactory conductivity, for example, aluminum, nickel, titanium, stainless steel, or the like, and may be in various forms such as a sheet type, a thin type, a mesh type, and the like. A thickness of the cathode current collector 3 is not particularly limited, and may be, for example, 5 to 30 μm.

As described above, a cathode having a cathode mixture layer formed on a cathode current collector may be prepared by coating a cathode mixture slurry on at least one surface of the cathode current collector, drying the cathode mixture slurry to obtain a cathode mixture layer, and rolling the cathode mixture layer to predetermined density.

More specifically, a first cathode mixture slurry including a first cathode active material may be coated on the cathode current collector, and a second cathode mixture slurry including a second cathode active material may be coated on the cathode current collector. The second cathode mixture slurry may be coated simultaneously with the first cathode mixture slurry, or may be coated continuously or at a predetermined time interval after the first cathode mixture slurry is coated.

In addition, a drying operation of removing a solvent while the cathode mixture slurry is coated or at regular time interval after the cathode mixture slurry is coated may be included. In the drying operation, the second cathode mixture slurry may be coated after the first cathode mixture slurry is dried, and the first cathode mixture slurry and the second cathode mixture slurry may be dried simultaneously.

A drying means is not particularly limited, and a drying means generally used for electrode drying may be applied. For example, various drying methods such as natural drying, heat drying, reduced pressure drying, and blowing drying may be used. In addition, drying may be performed in two or more operations.

A rolling process may be performed after the drying process, and a thickness and density of the cathode mixture layer may be adjusted using the rolling process. The rolling may be performed by a general method such as a roll press method or a flat press method. The thickness of the cathode mixture layer obtained by performing the rolling process is not particularly limited, and may be, for example, 20 μm or more and 200 μm or less, specifically, 30 μm or more, 40 μm or more, 60 μm or more, 80 μm or more, or 100 μm or more, and may be 200 μm or less, 180 μm or less, 160 μm or less, 150 μm or less, or 120 μm or less.

In addition, the density of the cathode mixture layer may be controlled by performing the rolling process, and is not particularly limited, but the density of the cathode mixture layer may be, for example, 1.2 $g/cm^3$ or more to improve battery output, lifespan, and high-temperature storage properties. More specifically, the cathode mixture layer may be 1.2 $g/cm^3$ or more or 1.5 $g/cm^3$ or more, and may be 2.2 $g/cm^3$ or less, 2.1 $g/cm^3$ or less, or 2.0 $g/cm^3$ or less.

The multilayer cathode provided in the present disclosure as described above may include a cathode active material having an olivine structure such as LFP to improve battery safety, and may include a cathode mixture layer including a cathode active material having a layered structure, such as NCM, formed on a cathode current collector to improve adhesion to the cathode current collector, electrolyte wettability, and electronic conductivity, thereby improving battery performance.

A lithium secondary battery including a cathode according to the present disclosure may be provided. Specifically, the lithium secondary battery may be provided by alternately stacking a cathode and an anode according to the present disclosure using a separator as a boundary to prepare an electrode assembly, inserting the electrode assembly into a battery case, sealing the battery case, and injecting an electrolyte.

The anode may be prepared by coating, on an anode current collector, an anode mixture slurry including an anode active material, a binder, and a solvent, and including a conductive agent and a thickener, as necessary, and drying the anode mixture slurry to obtain a cathode mixture layer and rolling the anode mixture layer to predetermined density.

The anode active material may be a carbon-based anode active material. As the carbon-based anode active material, an anode active material generally used to manufacture an anode of a secondary battery may be appropriately used in the present disclosure, and is not particularly limited, but may include crystalline carbon-based active materials such as artificial graphite and natural graphite, and the artificial graphite or natural graphite may be amorphous, plate-shaped, flake-shaped, spherical, fibrous, or combinations thereof.

The anode active material may include artificial graphite and natural graphite alone or in combination. When the artificial graphite and natural graphite are mixed, a mixing ratio may be 70:30 to 95:5 as a weight ratio. The artificial graphite may further improve dispersibility of a slurry, and may improve lifespan and high-temperature storage properties.

In addition, the anode active material may include at least one of a silicon (Si)-based anode active material, a tin (Sn)-based anode active material, or a lithium vanadium oxide anode active material, and the anode active material may be used together with the carbon-based anode active material. When a non-carbon-based anode active material is mixed with the carbon-based anode active material, as described above, the non-carbon-based anode active material may be included within a range of 1 to 50 wt % with respect to a total weight of the anode active material.

The Si-based anode active material may be Si, a Si—C composite, SiOx (0<x<2), or a Si-Q alloy. In the Si-Q alloy, Q may be an element selected from the group consisting of an alkali metal, an alkaline earth metal, a group 13 element, a group 14 element, a group 15 element, a group 16 element, a transition metal, a rare earth element, and combinations thereof, specifically, may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

In general, as the anode active material, the Si-based anode active material is known to have a property such as a large volume change. Accordingly, the Si-based anode active material may be additionally included, together with the carbon-based anode active material such as graphite. In this case, a carbon nanotube may be included as a conductive agent so as to prevent swelling caused by volume expansion of the Si-based anode active material.

The Sn-based anode active material may be Sn, $SnO_2$, or an Sn—R alloy. In the Sn—R alloy, R may be an element selected from the group consisting of an alkali metal, an alkaline earth metal, a group 13 element, a group 14 element, a group 15 element, a group 16 element, a transition metal, a rare earth element, and combinations thereof, specifically, may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof. In addition, at least one of the above-described elements may be mixed with $SiO_2$ and used.

A content of an anode active material in an anode mixture layer may be 94 to 98 wt % with respect to a total weight of the anode mixture layer.

The conductive agent may be used to provide conductivity to an electrode, and any conductive agent generally used in a secondary battery may be used as the conductive agent. For example, the conductive agent may include a carbon-based material such as natural graphite, artificial graphite, carbon black, acetylene black, Ketjen black, a carbon fiber, or a carbon nanotube, a metal-based material such as a metal powder such as copper, nickel, aluminum, or silver, or a metal fiber, a conductive polymer such as a polyphenylene derivative, or a conductive material including mixtures thereof.

A content of the conductive agent may be 0.1 to 3 wt % with respect to the total weight of the anode mixture layer.

The binder may bind anode active material particles to each other, and may bind the anode active material to the anode current collector. An aqueous binder may be used, but the present disclosure is not limited thereto.

The aqueous binder binder may include a styrene-butadiene rubber (SBR), an acrylated styrene-butadiene rubber, an acrylonitrile-butadiene rubber, an acrylic rubber, a butyl rubber, an ethylene-propylene copolymer, polyepichlorohydrin, polyphosphazene, polyacrylonitrile, polystyrene, an ethylene-propylene-diene copolymer, polyvinylpyridine, chlorosulfonated polyethylene, latex, a polyester resin, an acrylic resin, a phenol resin, an epoxy resin, a polyvinyl alcohol resin, an acrylate-based resin, or combinations thereof.

A content of the binder may be 1.5 to 3 wt % with respect to the total weight of the anode mixture layer.

The thickener may be used to provide viscosity, and may include a cellulose-based compound, and may include, for example, a mixture of one or more of carboxymethyl cellulose, hydroxypropyl methyl cellulose, methyl cellulose, or alkali metal salts thereof. The alkali metal may include Na, K, or Li.

The thickener may be used in an amount of 0.1 to 3 parts by weight with respect to 100 parts by weight of the anode active material.

The solvent may be an aqueous solvent such as water.

In the present disclosure, the anode current collector may include at least one selected from the group consisting of copper foil, nickel foil, stainless steel foil, titanium foil, nickel foam, copper foam, a polymer substrate coated with a conductive metal, and combinations thereof.

A thickness of the anode current collector is not particularly limited and may be, for example, 5 to 30 μm.

As described above, an anode having an anode mixture layer formed on an anode current collector may be prepared by coating an anode mixture slurry to one or both surfaces of the anode current collector, drying the anode mixture slurry, and rolling the anode mixture slurry. In this case, the anode mixture layer may be a single layer, two layers, or three or more layers.

Drying and rolling for preparation of the anode mixture layer may be performed using a method the same as the method described above in connection with preparation of the cathode mixture layer, and detailed descriptions will be omitted.

EXAMPLES

Hereinafter, the present disclosure will be described in more detail by way of examples. The following examples are intended to illustrate the present disclosure and are not intended to limit the present disclosure.

Example 1

With respect to a solid weight, 95 wt % of an NCM622 cathode active material, 2 wt % of a PVDF binder, and 3 wt % of a carbon black conductive agent were mixed with an NMP solvent to prepare a slurry for forming a first cathode mixture layer.

With respect to the solid weight, 95 wt % of an LFP cathode active material, 2 wt % of a polyacrylic acid binder, and 3 wt % of a carbon black conductive agent were mixed with an NMP solvent to prepare a slurry for forming a second cathode mixture layer.

The slurry for forming the first cathode mixture layer was coated on both surfaces of an aluminum foil (thickness: 12 μm) as a cathode current collector, and dried. Subsequently, the slurry for forming the second cathode mixture layer was coated on the first cathode mixture layer, dried, and then rolled.

As a result, a cathode having the first cathode mixture layer and the second cathode mixture layer was prepared.

The prepared cathode had a thickness of 200 mm, and thicknesses of the first cathode mixture layer and the second cathode mixture layer had a ratio of 3:7.

Comparative Example 1

A cathode was prepared in the same manner as Example 1, except that a thickness ratio of a first cathode mixture layer and a second cathode mixture layer was adjusted to 5:5.

Comparative Example 2

A cathode having the same thickness of 10 mm was prepared using a slurry for forming a first cathode mixture layer.
Physical Property Evaluation
—Electrode Capacity—

Capacities of the cathodes prepared in Example 1 and Comparative Examples 1 and 2 were measured and were 47 Ah, 47.7 Ah, and 71 Ah, respectively. As can be seen from such results, it can been seen that Example 1 had a capacity similar to that of Comparative Example 1 even though a content of an NCM cathode active material in the entire cathode was lower than that of Comparative Example 1.
—Voltage and Temperature Change in Cathode—

Figure 3:
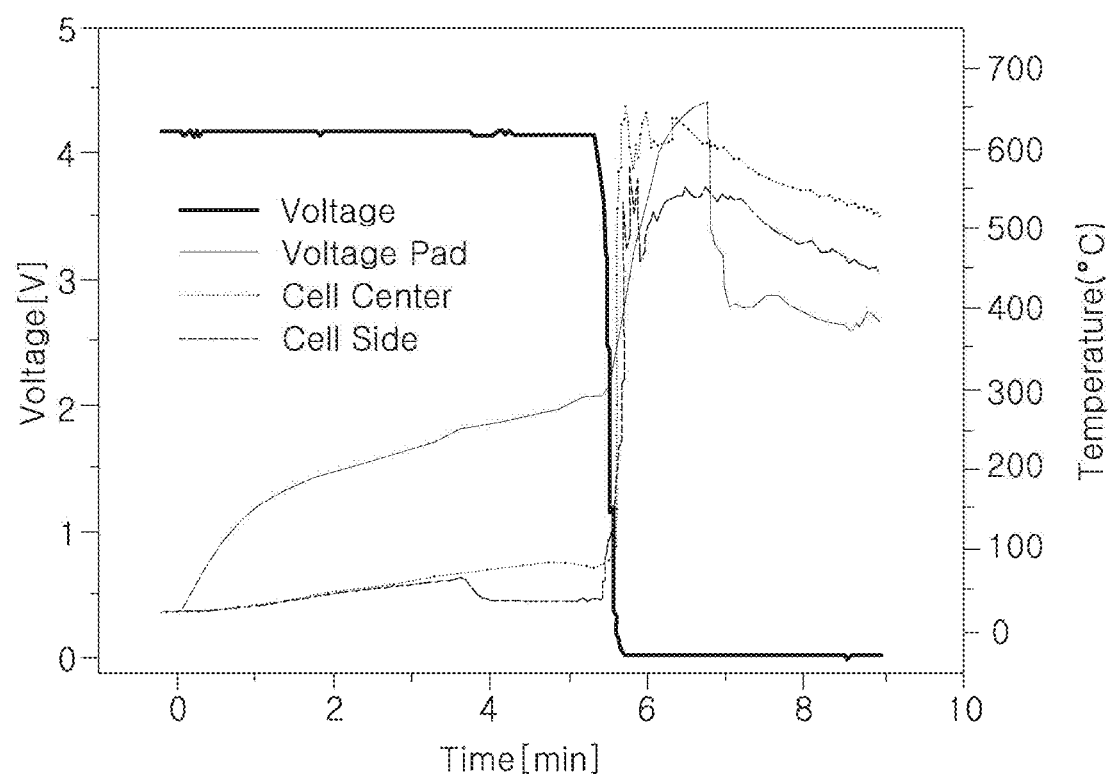
FIG. 3 is a graph illustrating a voltage change and a temperature change measured for a cathode of Example 1.
Figure 4:
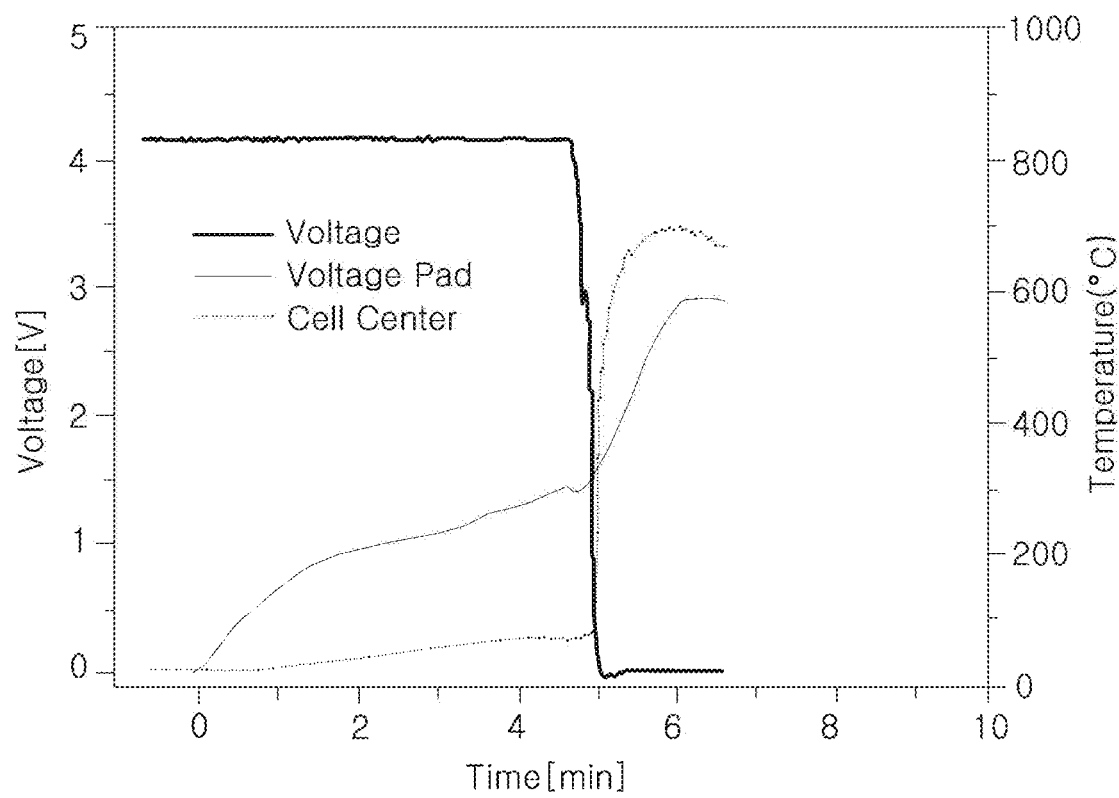
FIG. 4 is a graph illustrating a voltage change and a temperature change measured for a cathode of Comparative Example 1.
Figure 5:
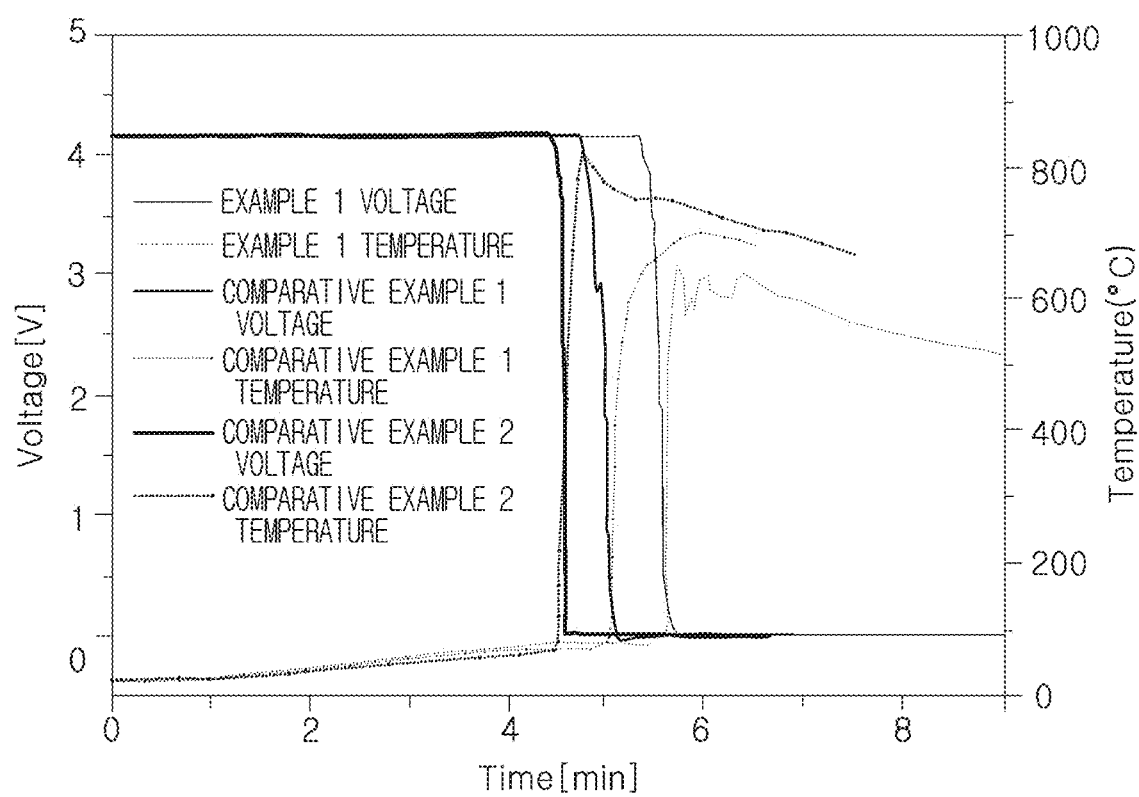
FIG. 5 is a graph illustrating a voltage change and a temperature change over time for a cathode of Example 1, a cathode of Comparative Example 1, and a cathode, including NCM as a cathode active material, of Comparative Example 2.

A voltage and a temperature change were measured for the cathodes prepared in Example 1 and Comparative Examples 1 and 2 using the following methods, and results thereof are illustrated in FIGS. 3 to 5.

Voltage Change: Connect a conducting wire to each of a cathode and an anode to measure a voltage of a cell and identify whether a vent occurs in the cell or the cell ignites as the cell voltage drops.

Temperature Change: Bring a heating pad to be into contact with a main chamber portion of the cell, heat the cell by applying current, and measure a temperature change in the cell caused by heating, using a temperature sensor.

FIG. 3 illustrates a voltage change and a temperature change in the cathode prepared in Example 1, and FIG. 4 illustrates a voltage change and a temperature change in the cathode prepared in Comparative Example 1.

In FIGS. 3 and 4, a drop in the voltage of the cell may indicate that a vent has occurred in the cell or the cell has been damaged due to ignition. As can be seen from FIG. 4, the cathode of Comparative Example 1 dropped in voltage before 5 minutes had elapsed. Conversely, as illustrated in FIG. 3, the cathode of Example 1 dropped in voltage after 5 minutes, 3, and maintained the voltage for a longer period, as compared to Comparative Example 1.

From FIGS. 3 and 4, it can be seen that the cathode of Example 1 did not ignite, and that the voltage was maintained for a longer period of time, thereby ensuring excellent battery stability. However, it can be confirmed that the cathode of Comparative Example 1, formed by forming a thick first cathode mixture layer using NCM as a cathode active material, did not exhibit the effect of increasing capacity, ignited within a short period of time, and had a rapid voltage drop, resulting in poor battery safety.

From such results, it can be seen that the cathode had further improved performance by adjusting the thickness ratio of the first cathode mixture layer and the second cathode mixture layer in the same manner as the cathode of Example 1.

FIG. 5 is a graph illustrating a voltage change and a temperature change over time for the cathodes of Example 1, Comparative Example 1, and Comparative Example 2. In FIG. 5, a drop in a voltage of a cell indicates that the cell has become incapable of functioning due to occurrence of a vent or ignition. The cathode of Comparative Example 2 lost a function of a cell most rapidly. Thus, it can be seen that the cathodes of Example 1 and Comparative Example 1 including LFP had excellent stability, as compared to the cathode of Comparative Example 2, and the cathode of Example 1 had excellent stability, as compared to the cathode of Comparative Example 1. From such results, it can be seen that as a content of LFP increases, a period of time for a cell to maintain a function thereof increases, indicating higher stability.

Only specific examples of implementations of certain embodiments are described. Variations, improvements and enhancements of the disclosed embodiments and other embodiments may be made based on the disclosure of this patent document.

What is claimed is:

1. A cathode comprising:
a current collector;
a first cathode mixture layer on at least one surface of the current collector; and
a second cathode mixture layer on the first cathode mixture layer,
wherein the first cathode mixture layer includes a first cathode active material having a layered crystal structure,
wherein the second cathode mixture layer includes the first active material and a second cathode active material having an olivine-based crystal structure,
wherein the first cathode mixture layer and the second cathode mixture layer have a thickness ratio of 1:9 to 4:6, and
wherein a content of the second cathode active material, included in a cathode mixture layer including the first cathode mixture layer and the second cathode mixture layer, is 50 wt % or more with respect to a total weight of a cathode active material including the first cathode active material and the second cathode active material.

2. The cathode of claim 1, wherein the first cathode active material is a lithium transition metal composite oxide represented by Formula 1:

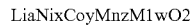   [Formula 1]

In Formula 1 above, M1 is at least one selected from the group consisting of Al, Mg, V, Ti, and Zr, and $0.9 \leq a \leq 1.5$, $0.5 \leq x < 1$, $0 < y \leq 0.4$, $0 < z \leq 0.4$, $0 < w \leq 0.04$, and $x+y+z+w=1$ are satisfied.

3. The cathode of claim 1, wherein the second cathode active material is a lithium transition metal oxide represented by Formula 2:

   [Formula 2]

In Formula 2, M is at least one selected from the group consisting of Fe, Mn, Ni, Co, and V.

4. The cathode of claim 1, wherein the second cathode mixture layer includes 0.5 to 30 wt % of the first cathode active material with respect to a total weight of a cathode active material including the first cathode active material and the second cathode active material in a cathode mixture layer including the first cathode mixture layer and the second cathode mixture layer.

5. The cathode of claim 1, wherein the second cathode mixture layer includes a linear conductive agent having an aspect ratio of 2 or more.

6. The cathode of claim 5, wherein the linear conductive agent is included in an amount of 1 to 10 wt % with respect to a total weight of a second cathode mixture layer.

7. The cathode of claim 1, wherein the second cathode mixture layer includes a linear conductive agent of at least one metal fiber selected from the group consisting of a carbon nanotube, a carbon fiber, copper, nickel, aluminum, and silver.

8. The cathode of claim 1, wherein the first cathode mixture layer further includes at least one conductive agent selected from the group consisting of a carbon fiber, a carbon nanotube, graphite, carbon black, a metal fiber, a metal powder, a conductive whisker, a conductive metal oxide, and a conductive polymer.

9. The cathode of claim 8, wherein the conductive agent is included in an amount of 1 to 10 wt % with respect to a total weight of the first cathode mixture layer.

10. The cathode of claim 1, wherein at least one of the first and second cathode mixture layers further includes a third cathode active material other than the first and second cathode active materials.

11. The cathode of claim 10, wherein the third cathode active material is at least one selected from the group consisting of $Li_2MnO_3$, $Li_2PtO_3$, $LiMn_2O_4$, and $LiNi_{0.5}Mn_{1.5}O_4$.

12. A lithium secondary battery, wherein
an anode and a cathode are alternately stacked,
a separator is interposed between the anode and the cathode, and
the cathode is the cathode of claim 1.

* * * * *